(12) United States Patent
Knauerhase et al.

(10) Patent No.: US 7,292,587 B2
(45) Date of Patent: Nov. 6, 2007

(54) METHOD AND APPARATUS FOR ENABLING CONNECTIVITY BETWEEN ARBITRARY NETWORKS USING A MOBILE DEVICE

(75) Inventors: Robert C. Knauerhase, Portland, OR (US); Nikhil M. Deshpande, Beaverton, OR (US); Du V. Nguyen, Tigard, OR (US)

(73) Assignee: Intel Corporation, Santa Clara, CA (US)

(*) Notice: Subject to any disclaimer, the term of this patent is extended or adjusted under 35 U.S.C. 154(b) by 942 days.

(21) Appl. No.: 09/966,161

(22) Filed: Sep. 27, 2001

(65) Prior Publication Data

US 2003/0058832 A1    Mar. 27, 2003

(51) Int. Cl.
*H04L 12/28*  (2006.01)
*H04L 12/56*  (2006.01)
*H04L 12/54*  (2006.01)
*H04J 3/22*  (2006.01)
*H04J 3/16*  (2006.01)

(52) U.S. Cl. .................. 370/401; 370/428; 370/466

(58) Field of Classification Search ............ 370/315, 370/338, 401, 412, 428–429, 466
See application file for complete search history.

(56) References Cited

U.S. PATENT DOCUMENTS

| 5,612,953 | A  | * | 3/1997  | Olnowich ............... 370/367 |
| 6,560,443 | B1 | * | 5/2003  | Vaisanen et al. ........ 455/73 |
| 6,643,522 | B1 | * | 11/2003 | Young .................. 455/552.1 |
| 6,735,448 | B1 | * | 5/2004  | Krishnamurthy et al. ... 455/522 |
| 7,024,553 | B1 | * | 4/2006  | Morimoto .............. 713/163 |
| 2002/0022453 | A1 | * | 2/2002  | Balog et al. ........... 455/41 |
| 2004/0151112 | A1 | * | 8/2004  | Matsubara et al. ...... 370/217 |
| 2006/0282518 | A1 | * | 12/2006 | Karaoguz et al. ....... 709/221 |

* cited by examiner

*Primary Examiner*—Kevin C. Harper
(74) *Attorney, Agent, or Firm*—Fish & Richardson P.C.

(57) ABSTRACT

A mobile device includes network interfaces for communicating wirelessly with two different networks. The mobile device may operate as a gateway between the two networks by switching between the two network interfaces in order to pass information from one network intended for the other network.

27 Claims, 6 Drawing Sheets

METHOD AND APPARATUS FOR ENABLING CONNECTIVITY BETWEEN ARBITRARY NETWORKS USING A MOBILE DEVICE

BACKGROUND

In a wireless network, data may travel from a wired network to mobile devices via base stations or directly between wireless users via radio or infrared waves. Data moves between client adapters in the mobile devices and access points throughout the network. An access point is a wireless device that serves as a bridge between wired and wireless networks.

The IEEE 802.11 standard, published Jun. 26, 1997, is a wireless LAN (Local Area Network) standard that specifies an "over the air" interface between a wireless station (mobile device) and an access point, as well as among other wireless stations. IEEE 802.11 defines two network configurations: an infrastructure configuration and an independent, or ad hoc, configuration. In the infrastructure configuration, clients communicate to access points, which are part of a distribution system having an infrastructure. In the ad hoc configuration, wireless stations communicate directly to each other, without the need for a communications infrastructure. However, coverage is limited to the radio (or IR) range of the wireless stations in the ad hoc network.

Wireless stations require an antenna and a 802.11 network interface. Wireless stations in the networks may include different types of mobile devices, for example, a laptop or desktop computer with a wireless modem, or a network-enabled mobile telephone or Personal Digital Assistant (PDA). A mobile device with an 802.11 network interface may operate in one of two communication modes, which correspond to the two network configurations. In an infrastructure mode, the wireless station may communicate with the infrastructure network via an access point. In an ad hoc mode, the wireless station may communicate with other mobile devices within range of the station's antenna.

DETAILED DESCRIPTION

Figure 1:
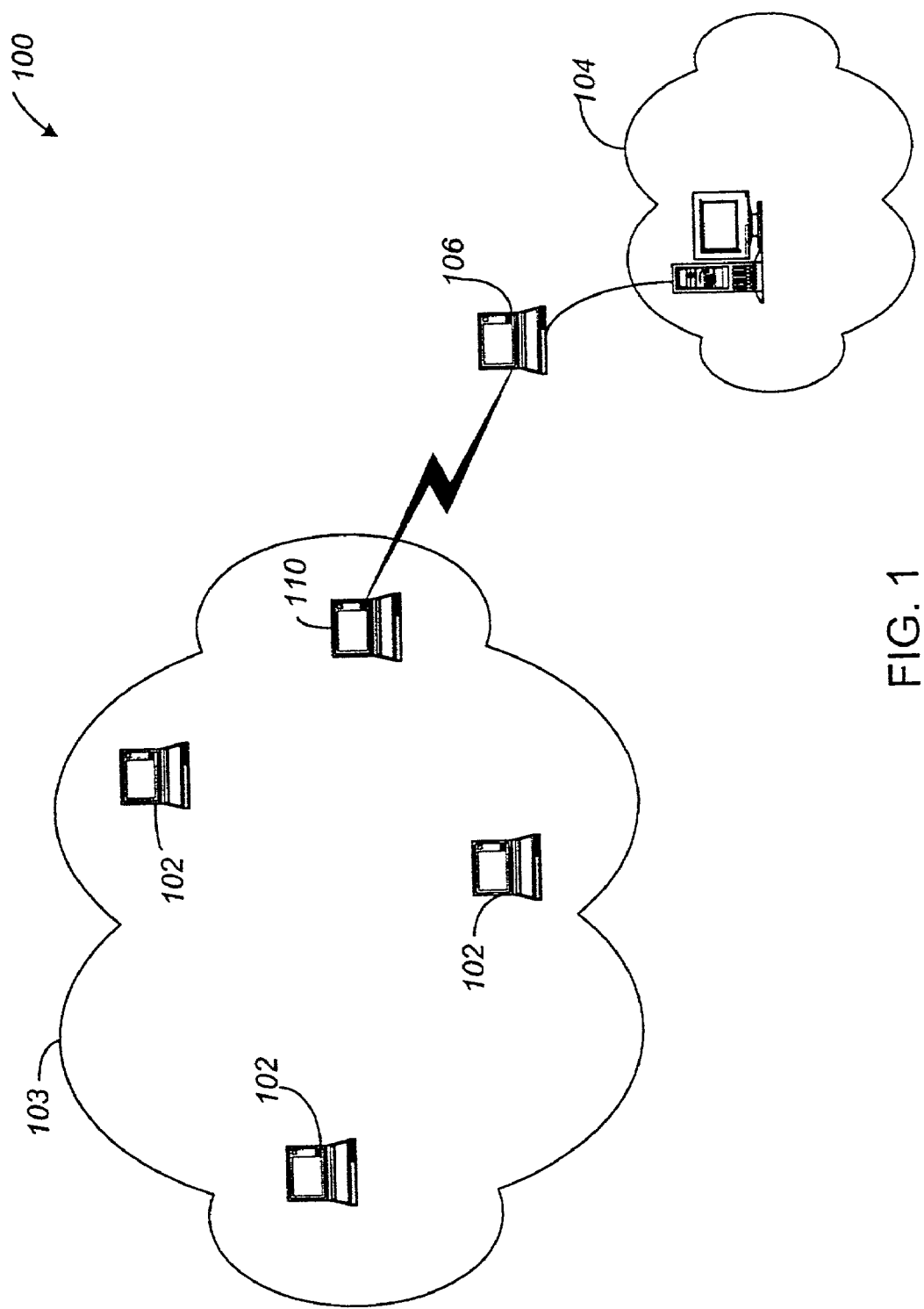
FIG. 1 is a block diagram of a network system including a gateway device for connecting an ad hoc wireless network and an infrastructure network according to an embodiment.

FIG. 1 illustrates a network system 100 according to an embodiment. The network system 100 may include a number of mobile devices 102 connected in a wireless, peer-to-peer network 103, and a larger network 104 having an infrastructure, which may include wired connections. The infrastructure network 104 may include, for example, a LAN (Local Area Network), a WAN (Wide Area Network), an Intranet, or the Internet. The mobile devices 102 include network interfaces which allow them to communicate in multiple communication modes. In one mode, a mobile device 102 may be able to connect with other mobile devices in the peer-to-peer network. In another mode, a mobile device may be able to connect with the larger network through an access point 106, which serves as a bridge between the wireless and wired network.

A mobile device 110 in the peer-to-peer network 103 may act as a gateway between other mobile devices in the peer-to-peer network and the larger network, allowing the other mobile devices to connect to the infrastructure network while still in the peer-to-peer communication mode.

Each mobile device includes an antenna for transmitting and receiving radio and/or infrared waves, a network interface, and driver software to support wireless connection to the networks. The mobile devices 102, 110 may include, for example, laptop or desktop computers with wireless modems, and network-enabled mobile telephones and Personal Digital Assistants (PDAs).

In an embodiment, the mobile devices include network interfaces which support the IEEE 802.11 standard for Wireless Local Area Networks (WLANs), published Jun. 26, 1997. The IEEE 802.11 standard is a wireless LAN standard developed by an IEEE (Institute of Electrical and Electronic Engineering) committee in order to specify an "over the air" interface between a wireless client and a base station or access point, as well as among wireless clients.

Like the IEEE 802.3 Ethernet and 802.5 Token Ring standards, the IEEE 802.11 specification addresses both the Physical (PHY) and Media Access Control (MAC) layers. At the PHY layer, IEEE 802.11 defines three physical mediums for wireless local area networks: diffused infrared, direct sequence spread spectrum (DSSS), and frequency hopping spread spectrum (FHSS)

While the infrared PHY operates at the baseband, the other two radio-based PHYs operate in the 2.4 GHz to 2.4835 GHz band, commonly known as the ISM band, a global band primarily set aside for industrial, scientific and medical use, which may be used for operating wireless LAN devices without the need for end-user licenses. In order for wireless devices to be interoperable they have to conform to the same PHY standard. All three PHYs specify support for 1 Mbps and 2 Mbps data rate. IEEE 802.11 b, an extension of the IEEE 802.11 standard, specifies support for higher data rates of 5.5 Mbps and 11 Mbps, the latter of which compares favorably with the 10 Mbps available with the popular 10BaseT standard for wired Ethernet LAN.

The 802.11 MAC layer, supported by an underlying PHY layer, is concerned primarily with rules for accessing the wireless medium. Multiple cells can overlap with each other for optimum coverage. Stations can operate in two different network configurations: an independent, or "ad hoc," configuration and an infrastructure configuration.

In the ad hoc configuration, the stations communicate directly to each other in a peer-to-peer fashion, without the need for infrastructure or an access point. The ad hoc configuration is useful for quick, ad hoc networking, for example, between a group of devices at a temporary site. An ad hoc network is relatively easy to operate, but a disadvantage is that the coverage area is limited by the range of the stations' antennas. Stations in such configuration are in a Basic Service Set (BSS), which acts as a cell in the network architectures. In the ad hoc configuration, the stations operation in an Independent BSS (IBSS).

In the infrastructure configuration, an access point 106 supports several other wireless stations in a BSS. Access points serve as bridges between the wireless cell and a fixed network having an infrastructure. The set of BSSs are called an Extended Service Set (ESS).

Two services provided by the MAC layer are association and reassociation. Association enables the establishment of wireless links between wireless clients and access points in infrastructure networks. Reassociation takes place in addition to association when a wireless client moves from one BSS to another BSS. Two adjoining BSSs form an ESS if they are defined by a common ESS identification (ESSID). If a common ESSID is defined, a wireless client may roam from one area to another.

As shown in FIG. 1, an ad hoc network 103 comprises an IBSS. The wireless stations in the ad hoc network each have a network interface configured in the ad hoc mode for peer-to-peer connections. As such, they cannot communicate with the infrastructure network 104 through the access point.

Figure 2:
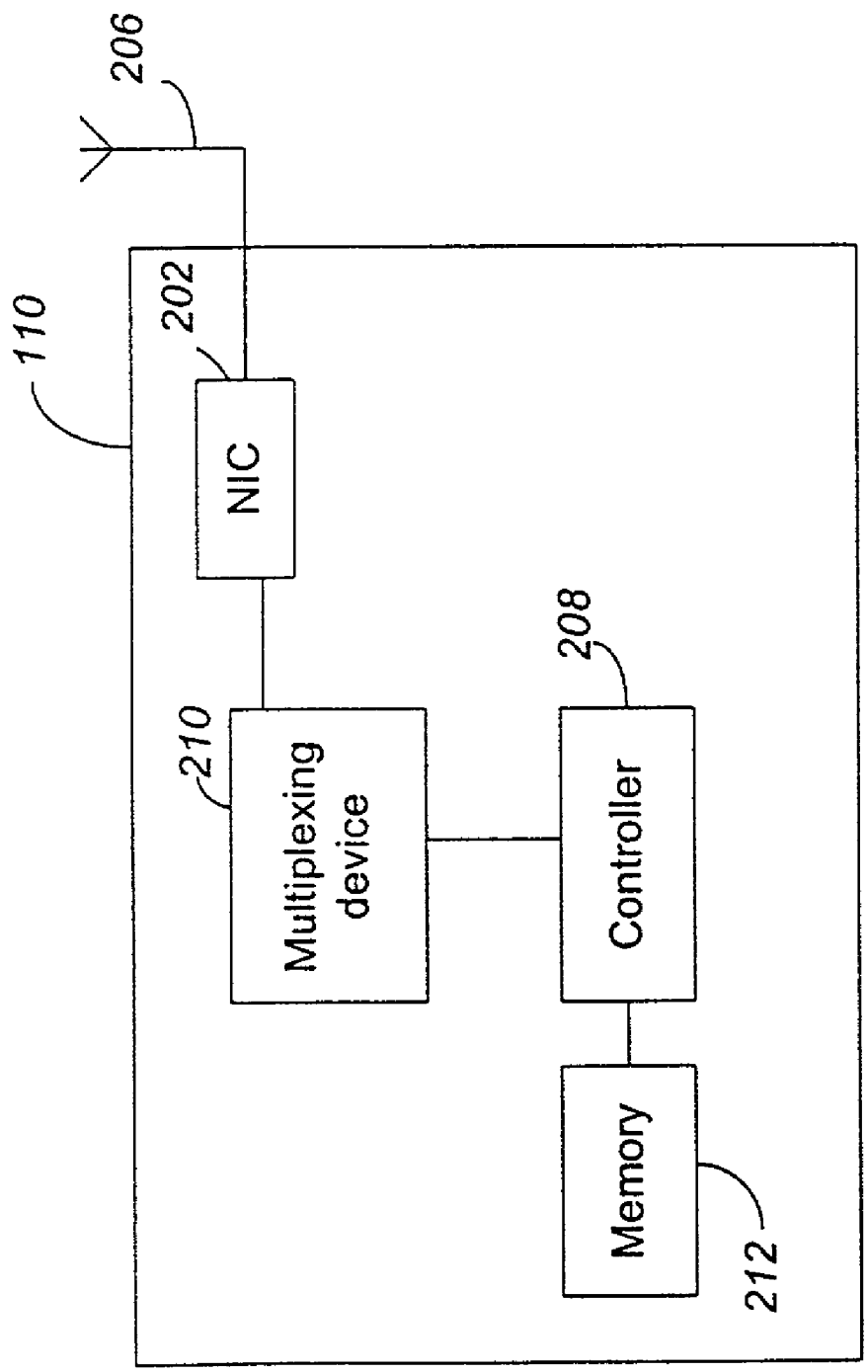
FIG. 2 is a block diagram of a gateway device according to an embodiment.

As shown in FIG. 2, the gateway device 110 includes an 802.11 interface which participates in ad hoc mode with an ad hoc network 120 and in infrastructure mode with infrastructure network 104 via access point 106. The gateway device 110 further comprises a multiplexing device 210 operative to switch a connection to the antenna 206 between network interfaces, a controller 208 operative to control the multiplexing device 210 to switch the connection in response to detecting data intended to be communicated between a first network and a second network and after the detected data is stored in a memory 212.

Figure 3:
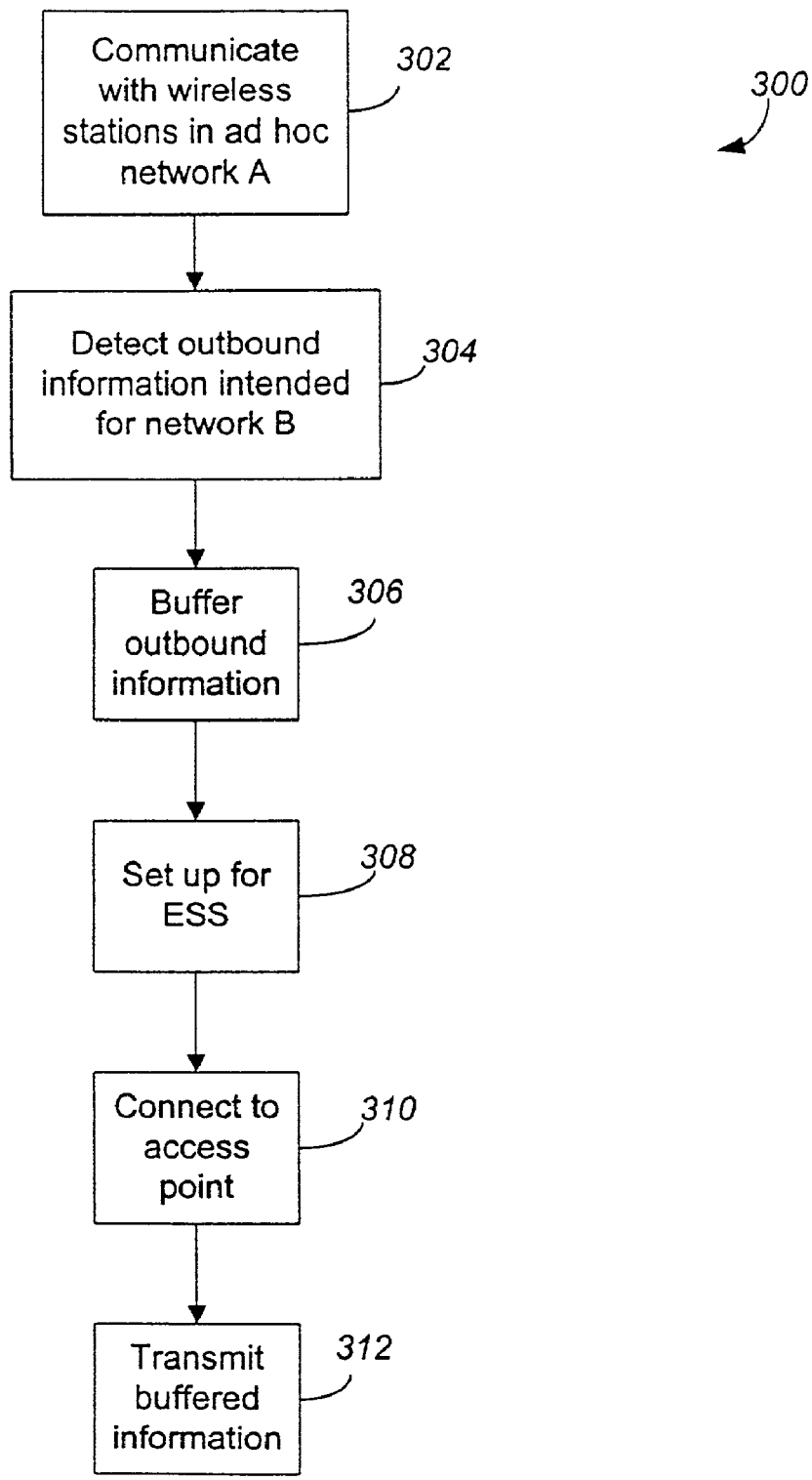
FIG. 3 is a flowchart describing a operation for providing a gateway between the ad hoc network and the infrastructure network according to an embodiment.

FIG. 3 is a flowchart describing a gatewaying operation 300 according to an embodiment. The gateway device 110 may communicate with the other wireless stations in the ad hoc network in a peer-to-peer fashion using the ad hoc network interface 202 (block 302). When another wireless station sends data destined for the infrastructure network, e.g., by transmitting data intended for the Internet, the gateway device detects the outbound information (block 304), and stores it in the memory (block 306). The gateway device 110 then switches to the infrastructure mode (block 308), connects to the infrastructure network via the access point (block 310), and transmits the buffered information (block 312). Likewise, the gateway device may receive and buffer information from the infrastructure network intended for the other wireless station, switch modes, and transmit the buffered information to that wireless station. The gateway device should have relatively high computing and network capacities to enable it to switch rapidly between modes in order to provide a relatively smooth connection between the two networks.

The gateway device may provide security for the information communicated between the networks. IEEE 802.11 specifies an optional encryption scheme called wired equivalent privacy, or WEP, which may provide a privacy level equivalent to that of wired LAN by encrypting the RF signal, but at a cost in bandwidth. The strength of the encryption may vary. Other encryption algorithms, such as IPSEC (IP Security), may be used to secure IP traffic on either network. The same or different types of encryption may be provided in the different networks. The gateway device may de-crypt and re-encrypt data transmitted between the two networks to account for the different security mechanisms.

The gateway device may be used, for example, in a classroom environment. In an embodiment, a building includes an infrastructure that includes a wired connection to the Internet. The teacher's laptop may also have a network interface for a wired connection to the Internet. For a particular class session, the laptop computers brought into the classroom by the teacher and the students include network interfaces configured for a particular ad hoc network (IBSS). The teacher's laptop may serve as the gateway device, allowing students at different wireless stations (laptops) to access the Internet through the teacher's laptop via the wired connection. For the next class, another teacher's laptop may serve as the gateway device for a different IBSS.

Figure 4:
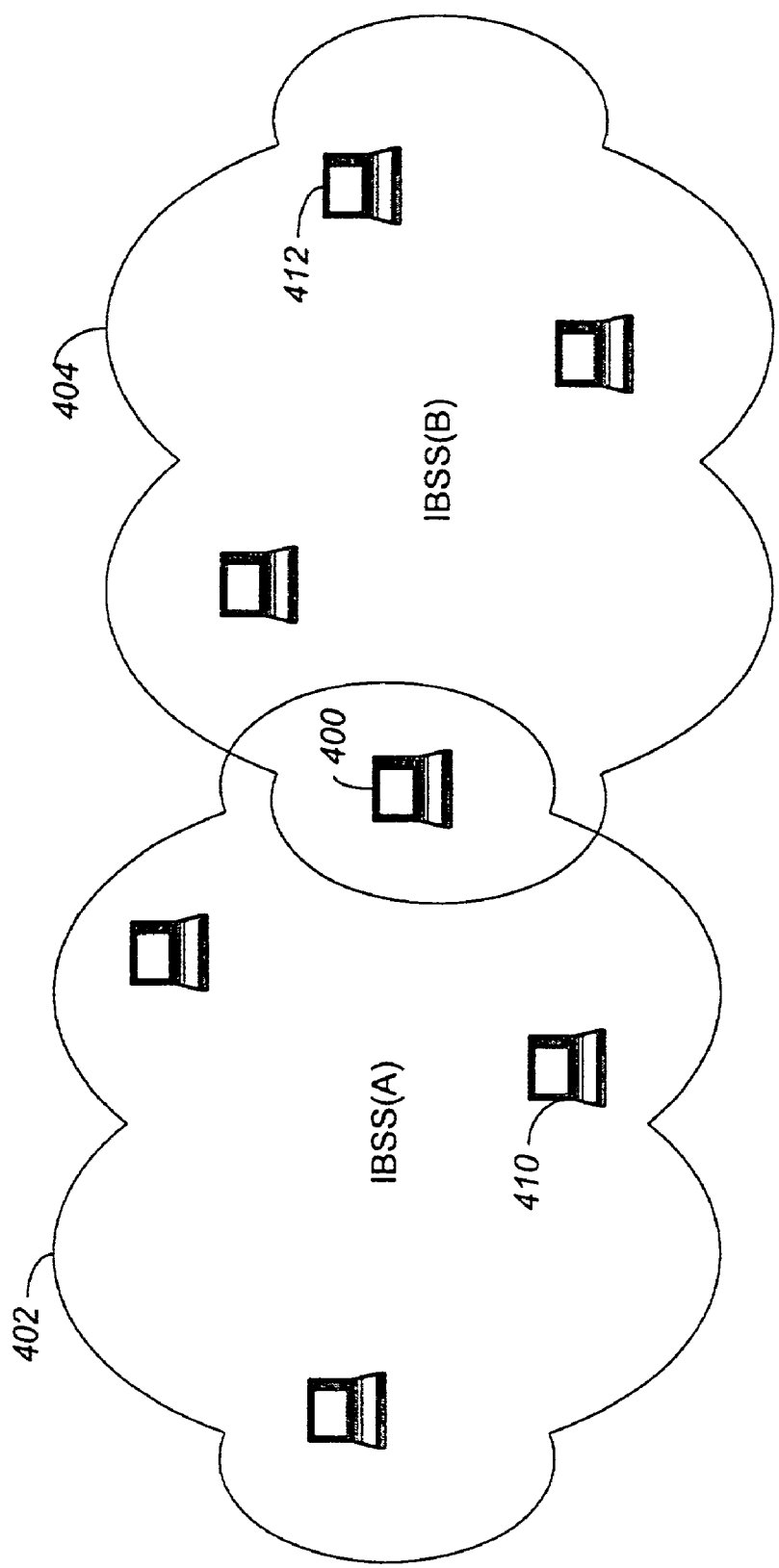
FIG. 4 is a block diagram of a network system including a gateway device for connecting two ad hoc networks according to an embodiment.

The gateway device may act as a gateway to other types of networks, other than an infrastructure network. For example, the other network may be another ad hoc network, in which the gateway device is configured to be a member, as shown in FIG. 4. In this example, the gateway device 400 includes a network interface which can participate in both ad hoc networks. When a device 410 in IBSS(A) transmits data intended for a device in IBSS(B), the gateway controller switches between the network interfaces, as described above in reference to FIG. 3. The gateway device 400 may be at the edge of the radio range of the two ad hoc networks. By providing a link between two ad hoc networks, an intermediary gateway device may extend the networking range otherwise possible with an ad hoc topology.

Figure 5:
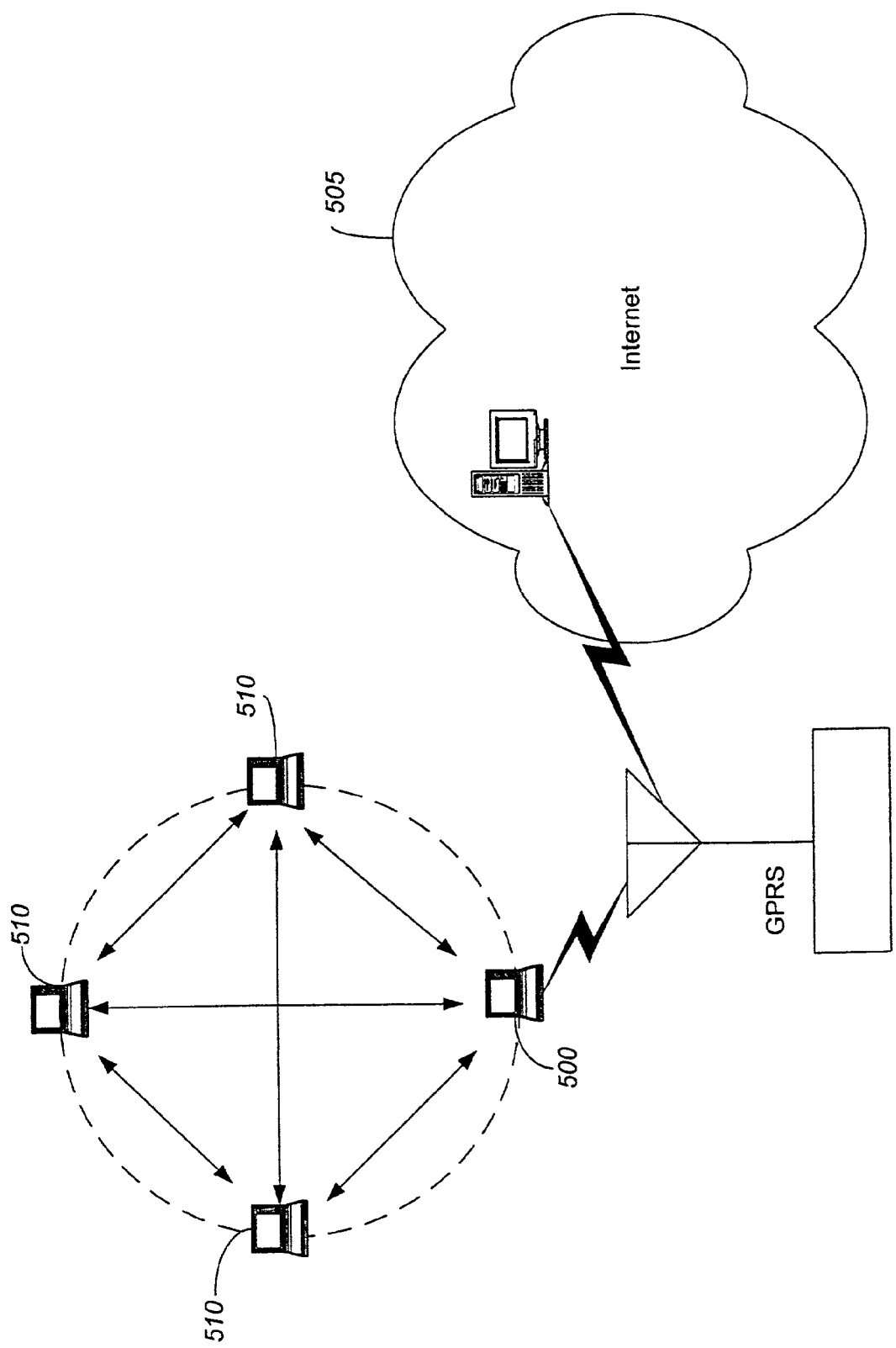
FIG. 5 is a block diagram of a network system including a gateway device for connecting an ad hoc wireless network and a GPRS (General Packet Radio Service) wireless network according to an embodiment.
Figure 6:
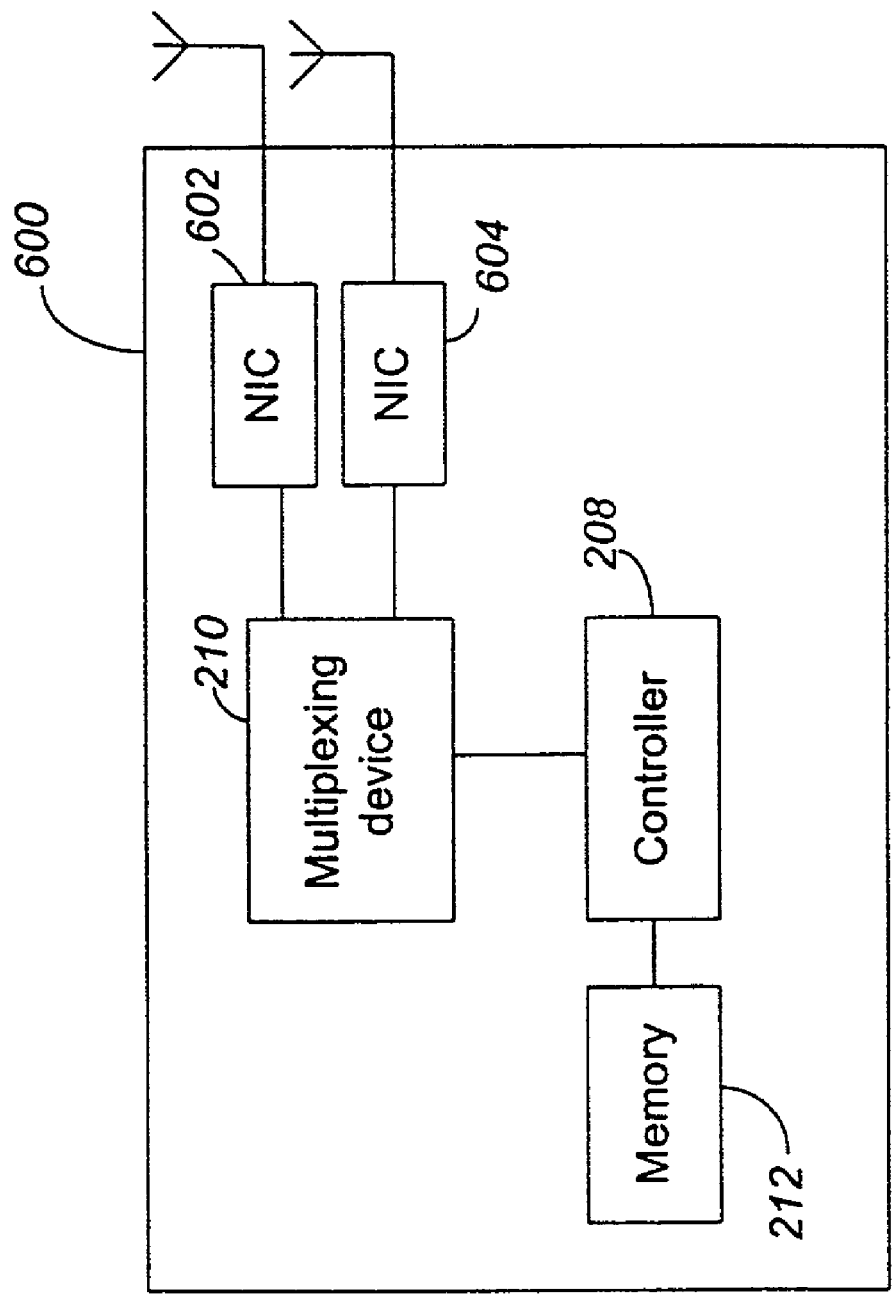
FIG. 6 is a block diagram of a gateway device according to another embodiment.

The other network may also be any other IP-based network. For example, the network may be a General Packet Radio Service (GPRS) network, as shown in FIG. 5. GPRS is a high-speed wireless IP network that enables "always-on" connection to the Internet. FIG. 6 shows an exemplary gateway device 600 for such a network. The gateway controller may switch between an 802.11 network interface 602 in ad hoc mode and a GPRS network interface 604 to enable connections between the wireless stations 510 and the Internet 505 via the gateway device 500.

Switching between network interface configurations may include switching a single network interface card rapidly between two network configurations, or switching between two (or more) network interface cards in the mobile device, each card in a different network configuration.

The wireless network connections may be any type of IP-based network connection, e.g., an existing TCP socket in a TCP/IP network. Alternatively, the gateway device may act as a gateway between an IP-based network and a circuit switched network, e.g., a cellular phone network. For example, the gateway device may be a cellular phone (or be acting as one) connected to a circuit switched cellular network. The gateway device may receive a few seconds of voice information from the cellular network and convert and encapsulate the information into packets for transmission to a Voice over IP (VoIP) network.

The information received by the gateway device to be transferred between networks may be any type of packet of information, e.g., relatively low level packets of information in the OSI model, such as IP packets, up to higher level messages, such as a textual page or email message.

The techniques described here may be implemented in hardware or software, or a combination of the two. The techniques may be implemented in computer programs executed on one or more programmable computers that may each includes a processor, a storage medium readable by the processor (including volatile and non-volatile memory and/or storage elements), and suitable input and output devices. The programmable computers may be either general-purpose computers or special-purpose, embedded systems.

A number of embodiments have been described. Nevertheless, it will be understood that various modifications may be made without departing from the spirit and scope of the invention. For example, blocks in the operation described in the flowchart may be skipped or performed in a different order and still produce desirable results. Accordingly, other embodiments are within the scope of the following claims.

The invention claimed is:

1. A method comprising:
   communicating with a first network via a first wireless communication link in a first communication mode;

receiving encrypted data from the first network;
decrypting the encrypted data to form unencrypted data;
detecting that the unencrypted data is intended to be communicated to a second network;
storing the unencrypted data;
switching to a second communication mode after the unencrypted data is stored; and
transmitting the unencrypted data to the second network via a second communication link in the second communication mode.

2. The method of claim 1, wherein said transmitting the unencrypted data to the second network comprises transmitting the data via a wireless communication link.

3. The method of claim 1, further comprising:
receiving data from the second network;
detecting that said data is intended to be communicated to the first network;
storing said data;
switching to the first communications mode; and
transmitting the data from the second network to the first network via the first wireless communications link in the first communications mode.

4. The method of claim 1, wherein said switching comprises switching from a first network interface adapted for communication with the first network to a second network interface adapted for communication with the second network.

5. The method of claim 1, wherein said communicating with the first network comprises communicating with a first IP-based network.

6. The method of claim 5, wherein said communicating with the first network comprises communicating with an ad hoc network in compliance with the IEEE 802.11 standard.

7. The method of claim 1, wherein said communicating with the second network comprises communicating with a second IP-based network.

8. The method of claim 7, wherein said communicating with the second network comprises communicating with an infrastructure network in compliance with the IEEE 802.11 standard.

9. The method of claim 7, wherein said communicating with the second network comprises communicating with an ad hoc network in compliance with the IEEE 802.11 standard.

10. The method of claim 7, wherein said communicating with the second network comprises communicating with a General Packet Radio Service (GPRS) network.

11. Apparatus comprising:
an antenna operative to communicate on a wireless communications link;
a first network interface operative to format data for communication with a first network;
a second network interface operative to format data for communication with a second network;
a memory to store data;
a multiplexing device operative to switch a connection to the antenna between the first network interface and the second network interface; and
a controller operative to control the multiplexing device to switch the connection in response to detecting data intended to be communicated between the first network and the second network and after the detected data is stored in the memory.

12. The apparatus of claim 11, further comprising a storage device operative to store the data intended to be communicated between the first network and the second network.

13. The apparatus of claim 11, wherein the first and second networks comprise IP-based networks including wireless communications links.

14. The apparatus of claim 11, wherein the first network interface comprises an 802.11 network interface adapted for use in an ad hoc network.

15. The apparatus of claim 14, wherein the second network interface comprises an 802.11 network interface adapted for use in an infrastructure network.

16. The apparatus of claim 14, wherein the second network interface comprises an 802.11 network interface adapted for use in a second ad hoc network.

17. The apparatus of claim 14, wherein the second network interface comprises a General Packet Radio Service (GPRS) network interface.

18. An article comprising a computer-readable medium which stores computer-executable instructions, the instructions causing a computer to:
communicate with a first network via a first wireless communication link in a first communication mode;
receive encrypted data from the first network;
decrypt the encrypted data to form unencrypted data;
detect that the unencrypted data is intended to be communicated to a second network;
store the unencrypted data;
switch to a second communication mode after the unencrypted data is stored; and
transmit the unencrypted data to the second network via a second communication link in the second communication mode.

19. The article of claim 18, wherein the instructions causing the computer to transmit the data to the second network comprise instructions causing the computer to transmit the data via a wireless communication link.

20. The article of claim 18, further comprising instructions causing the computer to:
receive data from the second network;
detect that said data is intended to be communicated to a second network;
store said data;
switch to the first communications mode; and
transmit the data from the second network to the first network via the first wireless communications link in the first communications mode.

21. The article of claim 18, wherein the instructions causing the computer to switch modes comprise instructions causing the computer to switch communications from a first network interface adapted for communication with the first network to a second network interface adapted for communication with the second network.

22. The article of claim 18, wherein the first network comprises a first P-based network.

23. The article of claim 22, wherein first network comprises an ad hoc network in compliance with the IEEE 802.11 standard.

24. The article of claim 18, wherein the second network comprises a second IP-based network.

25. The article of claim 24, wherein the second network comprises an infrastructure network in compliance with the IEEE 802.11 standard.

26. The article of claim 24, wherein the second network comprises an ad. hoc network in compliance with the IEEE 802.11 standard.

27. The article of claim 24, wherein the second network comprises a General Packet Radio Service (GPRS) network.

* * * * *